United States Patent
Bandemer et al.

(10) Patent No.: US 10,356,638 B2
(45) Date of Patent: Jul. 16, 2019

(54) ESTIMATING QUALITIES OF LINKS BETWEEN NODES OF A WIRELESS NETWORK

(71) Applicant: Hewlett Packard Enterprise Development LP, Houston, TX (US)

(72) Inventors: Bernd Bandemer, Palo Alto, CA (US); Jose Tellado, Mountain View, CA (US); Arogyaswami Paulraj, Stanford, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 61 days.

(21) Appl. No.: 14/643,359

(22) Filed: Mar. 10, 2015

(65) Prior Publication Data

US 2016/0269920 A1    Sep. 15, 2016

(51) Int. Cl.
    *H04W 24/08*      (2009.01)

(52) U.S. Cl.
     CPC ................ *H04W 24/08* (2013.01)

(58) Field of Classification Search
     CPC .... G05B 23/0254; G07C 9/0111; G08G 1/14; H04W 24/02
     See application file for complete search history.

(56) References Cited

U.S. PATENT DOCUMENTS

| | | | |
|---|---|---|---|
| 7,460,837 B2 | 12/2008 | Diener | |
| 8,022,822 B2 | 9/2011 | Liang et al. | |
| 2003/0124977 A1* | 7/2003 | Smith | H04W 88/04 455/16 |
| 2004/0002776 A1* | 1/2004 | Bickford | G05B 23/0254 700/30 |
| 2004/0098610 A1* | 5/2004 | Hrastar | H04L 41/0893 726/1 |
| 2006/0290519 A1* | 12/2006 | Boate | G07C 9/00111 340/573.4 |
| 2007/0050240 A1* | 3/2007 | Belani | G08G 1/14 705/13 |
| 2008/0151761 A1 | 6/2008 | Theisen et al. | |
| 2008/0151762 A1 | 6/2008 | Armstrong et al. | |
| 2008/0267145 A1 | 10/2008 | Vangati | |
| 2009/0097468 A1 | 4/2009 | Yi et al. | |
| 2009/0213822 A1* | 8/2009 | Keshavarzian | H04L 47/10 370/338 |
| 2010/0062735 A1* | 3/2010 | Sadana | H04W 28/24 455/226.1 |
| 2011/0188415 A1 | 8/2011 | Graziano | |
| 2012/0250546 A1 | 10/2012 | Hamida et al. | |

(Continued)

FOREIGN PATENT DOCUMENTS

CN      103716808 A   *   4/2014

*Primary Examiner* — Alex Skripnikov
*Assistant Examiner* — Richard Schnell
(74) *Attorney, Agent, or Firm* — Hewlett Packard Enterprise Patent Department

(57) ABSTRACT

Systems, methods and apparatuses for estimating qualities of links between nodes of a wireless network are disclosed. One method includes obtaining, by a service engine, a plurality of link quality signatures, wherein each of the plurality of link quality signatures includes link qualities between a network node and a plurality of network sensors, and estimating, by the service engine, link qualities between a plurality of network nodes based on the plurality of link quality signatures and an estimation model.

20 Claims, 6 Drawing Sheets

(56) References Cited

U.S. PATENT DOCUMENTS

| | | | |
|---|---|---|---|
| 2013/0070624 A1* | 3/2013 | Nguyen | H03M 7/30 370/252 |
| 2013/0227689 A1 | 8/2013 | Pietrowicz | |
| 2014/0362711 A1* | 12/2014 | Jiang | H04W 24/02 370/252 |
| 2015/0304929 A1* | 10/2015 | Hua | H04W 36/32 455/436 |
| 2016/0037559 A1 | 2/2016 | Malik et al. | |

* cited by examiner

Obtaining, by a network service engine, a plurality of link quality signatures, wherein each of the plurality of link quality signatures includes link qualities between a network node and a plurality of network sensors

510

Estimating, by the network service engine, link qualities between a plurality of network nodes based on the plurality of link quality signatures and a network estimation model.

ESTIMATING QUALITIES OF LINKS BETWEEN NODES OF A WIRELESS NETWORK

FIELD OF THE DESCRIBED EMBODIMENTS

The described embodiments relate generally to wireless communications. More particularly, the described embodiments relate to systems, methods and apparatuses for estimating qualities of links between nodes of a wireless network.

BACKGROUND

Wireless networks are being widely deployed due to the convenience of tether less communications. Wireless networks have been witnessing increasing capacity/data rates, coverage and seamless connectivity. Wireless networks span wide area including satellite networks to wide area mobile networks to local area WiFi (Wireless Fidelity) to restricted (room) or personal area networks. These WiFi networks offer a low cost way of achieving high data throughput rates. Some of these networks, such as cellular, use licensed frequency bands, while others operate in unlicensed bands. More recently, more complex ways of band sharing have also been introduced. Due to the nature of wireless propagation and the complex protocols used in transmission and access, wireless networks often show a range of problems from simple inability to connect to the network to poor throughput performance.

Such problems are particularly evident in Wi-Fi networks that use Carrier Sense, Multiple Access with Collision avoidance (CSMA/CA) mechanisms to regulate transmissions. Briefly, each wireless network end device detects if the medium is being used; if so, the end device waits a random amount of time before trying to transmit again. This method of contending for the medium is simple, intrinsically fair, and requires no central scheduling. However, in the case of densely deployed Wi-Fi networks, this method of communication has a number of shortcomings, which include co-located Wi-Fi devices contending for the medium back-off to one another, leading to wasted time when the channel is idle. Further, co-located Wi-Fi devices that pick the same back-off time cause packets to collide over-the-air, leading to packet loss and reduced throughput. Further, end device vendors implement proprietary algorithms (e.g., for roaming) that lead to sub-optimal network performance. Further, end devices expose limited control (e.g., to schedule transmissions) for the network to optimize their performance. Further, legacy (802.11a/b/g) end devices reduce overall network throughput because they use much lower speeds and hence occupy the medium for longer time periods. Further, since WiFi uses unlicensed bands shared by other non-WiFi devices which do not follow WiFi protocols, they can cause increased contention and packet loss in Wi-Fi networks. A number of anomalies can result in wireless networks that can be hard to detect, difficult diagnose and complex to fix. Such anomalies can range for inability to connect or reconnect, poor or intermittent throughput, which we describe as poor user experience. Poor user experience increases operations cost, poor customer or user satisfaction.

It is desirable to have systems, methods and apparatuses for sensing conditions of the wireless network.

SUMMARY

An embodiment includes a method of estimating qualities of links between nodes of a wireless network. The method includes obtaining, by a service engine, a plurality of link quality signatures, wherein each of the plurality of link quality signatures includes link qualities between a network node and a plurality of network sensors, and estimating, by the service engine, link qualities between a plurality of network nodes based on the plurality of link quality signatures and an estimation model.

An embodiment includes a wireless network. The wireless network includes a plurality of network nodes, a plurality of network sensors, and a service engine. The service engine is operative to obtain a plurality of link quality signatures, wherein each signature includes link qualities between a network node and a plurality of network sensors, and estimate link qualities between a plurality of network nodes based on the plurality of link quality signatures and a network estimation model.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 5 is a flow chart that includes steps of method of estimating quality of wireless links between different wireless end devices, according to an embodiment.

DETAILED DESCRIPTION

Figure 1:
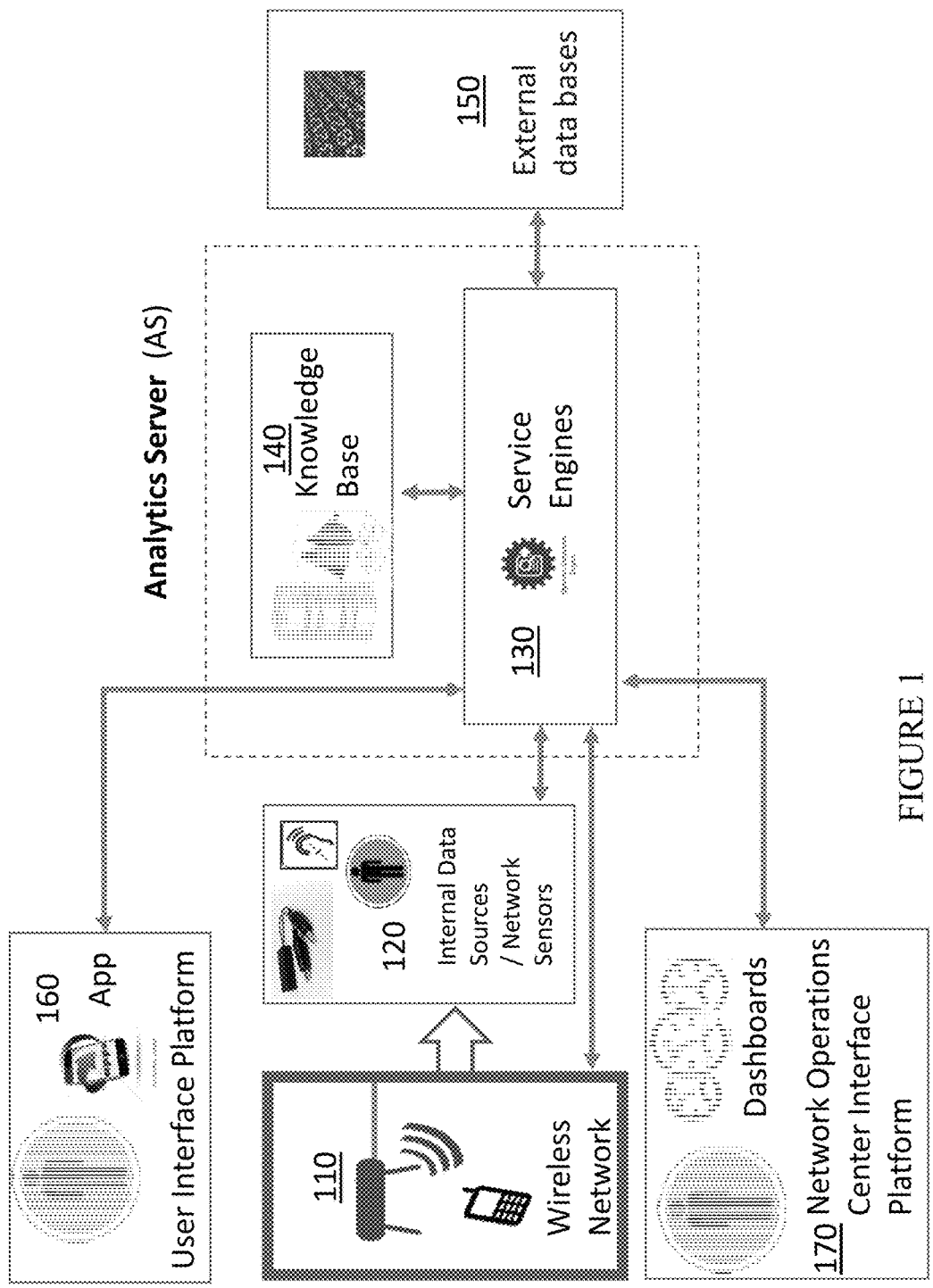
FIG. 1 shows a block diagram of a sense, model and control methodology for improving performance of a wireless network, according to an embodiment.

At least some embodiments for addressing problems in wireless network include sensing a variety of information directly or indirectly related to the wireless network, building comprehensive models of the wireless network, and then exploiting these models to derive anomaly reports, problem diagnosis and recommended changes to network settings. Implemented through automatic control or through man-in-the-loop interventions, these outcomes can be used to improve both user experience and operator costs.

For at least some embodiments, the sensing function is broad and includes wireless sensors that work in-band to the target network, wired sensors that tap data at various end points in the wired segments of network and other sensors such as imaging sensor, occupancy sensor, audio sensor, other radio sensor, light sensor etc. to support comprehensive model building.

For at least some embodiments, the modeling of the wireless network and the related radio environment captures the complex interactions of the elements in the wireless network including path losses, channel condition, as well as the other in-band networks or interferers. Such network models held in databases may also include user locations, user movement, application being used, characteristics of the user device, user presence/location occupancy, user identity and profile etc. For at least some embodiments, the model techniques include multi-category models, lists, if then rules and other techniques, and formats. The modeling function not only depends on internally sensed data but also on data obtained from external databases.

For at least some embodiments, the controlling or output function includes automatic (direct) control of network parameters, or man-in-the-loop interventions including interactive diagnostic support or recommendations to network operators or to end users who can take corrective action. These control or output function are generated by various Service Engines that interact with various entities such as internal data sources/sensors, end devices with associated users, NOC (Network Operations Center) with associated operators, and knowledge bases.

While the modeling function gathers and organizes data to support improvement of user experience or operator costs, such data may also be useful to outside entities or data bases for purposes of coordinating or understanding network or user behavior. Suitable external interface need to be defined for this purpose.

The net result of such a sense-model-control/interact overlay to wireless network is improved user experience and lower operator costs.

Definitions

For the described embodiments, a network end device or end device is generally defined as a device that terminates a wireless link, and could be a Station I STA or terminal (user end) or access point or base station or relay node (network end). Further, a station I STA is generally defined as an end device that is associated with a user end of link. An access point (AP) is generally defined as an end device associated with a network end of the link. A sensor is generally defined as any device that can sense the environment of a wire or a device. The sensor can be active or passive, and can also be a radio, acoustic, optical, IR etc. Further, the sensor can read data off a wire or register. A wireless sensor is generally defined as a sensor that senses the radio environment to listen to signals, analyse the signals or decode/demodulate the signals.

As mentioned, at least some of the described embodiments provide systems, methods and apparatuses for sensing, modeling and controlling a wireless network, providing improved user experience and lower operator costs. At least some of the described embodiments provide improved abilities to understand and solve connectivity problems such as wireless STA being unable to connect or to re-connect with network. Further, at least some of the described embodiments provide improved abilities to understand, anticipate and solve performance problems such as mutual interference, or interference from non-WiFi devices, poor throughput, poor coverage, etc. Further, at least some of the described embodiments involve improved abilities of wireless end devices to support improved or augmented data collection, sensing and reporting functions. Likewise, at least some of the described embodiments also involve end devices that are augmented to improve performance based on accepting additional control inputs.

Further, at least some of the described embodiments provide interactions with external data entities to aid network modeling or knowledge base development.

Further, at least some of the described embodiments include providing data from the knowledge base or sensor outputs to external entities for improved third party data analytics.

FIG. 1 shows a block diagram of a sense, model and control system for improving performance of a wireless network 110, according to an embodiment.

Wireless Network

The wireless network 110 may be any type of network using wireless radio transmission in any electromagnetic frequency, spanning global area, wide area, local area and personal area. The wireless network 110 can be long range to very short range. The wireless network 110 can serve end users or machines (no human user). The wireless network 110 can involve any wireless standard from Iridium like LEO satellite communications, mobile networks like 3G and 4G, to WiFi networks to Bluetooth and 802.14 networks.

For at least some embodiments, the wireless network 110 includes STAs and APs. In one embodiment, the wireless network consists of one or more STAs and one or more APs. In another embodiment, the wireless network consists of two or more wireless stations (STAs).

Network Sensors/Internal Data Sources

FIG. 1 shows internal data sources (including network sensors) 120 which represent the various network sensors that are the sources of monitoring data about the wireless network 110. The network sensors 120 sense the state of the wireless network 110, which can then be used to model and eventually control the wireless network 110 to improve user experience and lower operator costs.

For at least some embodiments, the network sensors 120 include one or more of multiple sensing modalities, such as wireless sensing covering licensed and unlicensed bands; wired network sensors that listen to traffic on the wired segments or read internal registers inside network elements such as routers, controllers, APs, STAs, switches; cameras or imaging devices in multiple spectrum bands, motion detectors, light detectors. Sensing can also extend to humans-in-loop providing specific data or inputs on network state or fault condition. The list of possible functions of the network sensors 120 is not limited.

For at least some embodiments, the network sensors 120 form their own parallel (overlay) network to the primary wireless network 110.

For at least some embodiments, the network sensors 120 include wireless probes or sensors that are placed at different points within the wireless network 110. For one embodiment, at least a portion of the network wireless sensors 120 are embedded within one or more APs or one of more STAs For another embodiment, at least a portion of the network sensors 120 are independent of APs or STAs and may be housed in independent boxes.

For at least some embodiments, network sensors 120 listen on wired connections as data exit or enter components of the wireless network 110 such as APs, switch, AP controller, AP manager to extract data from their communication behavior.

For at least some embodiments, network sensors include software agents that run on components of the wireless network 110 such as APs, switch, AP controller, AP manager to extract data from their internal operation.

For at least some embodiments, the network sensors 120 are configurable. As previously stated, for at least some embodiments, the network sensors 120 are controllable by service engine 130.

As stated, for at least some embodiments, the network sensors 120 sense conditions of the network 110. Moreover, for at least some embodiments, the network sensors 120 include receiving manual (man-in-the-loop) inputs from a user device such as, user interface platform 160 or NOC interface platform 170.

For at least some embodiments, the network sensors 120 receive wireless packets transmitted from one wireless device to another wireless node of the wireless network 110.

That is, the network sensors 120 include a receiver that is operable to receive wireless packets that are intended for reception by the other wireless node of the wireless network. For an embodiment, the network sensors 120 passively "over hear" the wireless packets. Characteristics of the overheard wireless packets can be used to characterize performance of the wireless network 110.

For at least some embodiments, the network sensors 120 include functionality that allows for more optimal network sensor placement using the sensed data.

Further, at least some embodiments include orchestration of data collection to reduce data bandwidth (to, for example, the knowledge database).

Further, at least some embodiments include real time control of data collection and transmission.

Further, at least some embodiments include multiple levels of probes that accommodate trade-offs between cost and function.

Further, at least some embodiments, the network sensors can act as relays for main network.

Further, at least some embodiments include the network sensors are embedded into powered appliances (Light bulbs, USB charging points, coffee pots, . . . )

For at least some embodiments, the data collected by the sensors may be sensitive involving security and or privacy concerns. Therefore the data collection, data transmission and data editing/compression must be employ security policies that are in force or agreed upon.

For at least some embodiments, the network sensors are configured based on a demand basis or anomaly basis.

For at least some embodiments, the multiple network sensors are orchestrated to fuse sensed data and improve the quality of the sensed data.

For at least some embodiments, the sensed data of the multiple network sensors is compressed to reduce bandwidth needed to transmit such data to the sensor service engine and knowledge base.

Service Engines

For at least some embodiments, service engine 130 refers to a collection of different engines, one each for a specific function. The list of service engines provided is only representative and not limited.

Sensor Service Engine

For at least some embodiments, the sensor service engine of the service engines 130 receives data from internal data sources, and for at least some embodiments, provides at least some control over the internal data sources (120). Further, for at least some embodiments, the sensor service engine both updates and stores wireless network information in a knowledge database 140, as well as accesses previously stored wireless network information to determine what additional sensing is needed or how sensors should be configured.

Further, for at least some embodiments, the sensor service engine processes data received from the network sensors 120.

At least some embodiments include sensor service engines that control data collection, compression, orchestration, configuration of sensors guided by the knowledge database 140, for example status and anomaly detects reported by an anomaly service engine.

External Service Engine

For an embodiment, an external service engine of the service engines 130 interacts with external databases 150 to send data from knowledge database 140 or from internal data sources 120. Further, the external service engine fetches data on as needed basis from external data bases and sends them to knowledge base/network modeling entity.

User Service Engine

For an embodiment, a user service engine of the service engines 130 interacts with the end user with an end device (user interface platform) 160, and for at least some embodiments, the user service engine interacts with a user via application interfaces running on the user device (user interface platform) 160. Further, for at least some embodiments, the user service engine provides information to the user device (user interface platform) 160, and additionally receives information from the user device (user interface platform) 160.

Network Operations Center (NOC) Service Engine

For an embodiment, an NOC service engine of the service engines 130 interacts with the NOC interface platform 170 that is used by operators to monitor the condition of the wireless network 100. Further, for at least some embodiments, the NOC service engine interacts with a NOC staff via application interfaces such as dashboards running on the NOC servers. Further, for at least some embodiments, the NOC service engine provides information to the NOC interface platform 170 and additionally receives information from the NOC interface platform 170.

Control Service Engine

For an embodiment, a control service engine of the service engines 130 interacts with the network 110 and the end devices such as APs and STAs as well as controllers and routers to change settings on these devices. For an embodiment, the control service engine is guided by an inference service engine which determines how network settings should be altered.

Anomaly Service Engine

For an embodiment, an anomaly service engine of the service engines 130 interacts with the other service engines and the knowledge base 140 to detect network anomalies. The anomaly detection is used by other service engines to take specific actions that result in final diagnosis and solution of the anomaly.

Inference Service Engine

For an embodiment, an inference service engine of the service engines 130 is triggered by the anomaly detection and it uses the data from the knowledge base and other information from user interface platform 160, NOC interface platform 170 and sensor data 120 to diagnose the network problem as well as find a solution to the anomaly. Solutions may be in terms of recommendations to the user interface platform interface 160 or NOC interface platform 170 or direct control of parameters of the network via the control service engine.

Network Models/Knowledge Database

For at least some embodiments, the Network model/knowledge database 140 includes a repository of all knowledge needed to provide services. For at least some embodiments, the knowledge database 140 includes different information segments each of which is relevant only to a single wireless network 110. For at least some embodiments, the knowledge database 140 contains information segments that are globally relevant and is shared across multiple wireless networks.

For at least some embodiments, the knowledge database 140 is operable with different formats. Such formats include, for example, relational databases, network, lists, association rules, graphical models, neural networks, decision trees, or probabilistic models.

For at least some embodiments, the knowledge database 140 includes dynamic (real-time) and/or persistent (historical) data.

For at least some embodiments, the knowledge database 140 includes different knowledge representations that are unique to WiFi or other specific networks.

For at least some embodiments, the knowledge database 140 includes black lists and white lists.

For at least some embodiments, the knowledge database 140 includes geographic (map) representation of data—STA location, inter device interference, Non-WiFi interference maps.

For at least some embodiments, the knowledge database 140 includes information that is global. That is information obtained from one wireless network is utilized at one or more different wireless networks.

For at least some embodiments, the knowledge database 140 is integrated with other entities. The other entities include, for example, calendar/event data base, STA location from GPS, home security database (for example, information on whether a user is in or out of house or office).

External Databases

For at least some embodiments, the external databases 150 include data inputs from third parties. The data input include, for example, end point characteristics, floor plans, AP location, firmware status of STA and APs or routers.

For at least some embodiments, the external databases 150 are interactive, and include, for example, a query response. For an embodiment, the query response includes sending captured network packets and receiving a classification result as to what application the packets belong to (Netflix, Skype, etc.).

For at least some embodiments, the external databases 150 includes data outputs for third analytics, and includes co-ordination with other networks to jointly improve user experience and lower operator costs.

For at least some embodiments, the external databases 150 is connectable with other entities—calendar/event data base, home security data bases (for example, information on whether a user is in or out of house or office), visit patterns, visit locations.

For at least some embodiments, the external databases 150 are connectable with external service entities like— what applications is this user using (packet inspection), what are known problems about this device (from MAC address).

User Interface Platform

For an embodiment, the user interface platform 160 includes a user device wherein an application is running on the user device. For at least some embodiments, the user interface platform 160 is utilized for improving the performance of the wireless network. For an alternate embodiment, the user interface platform 160 includes an application running on a separate device, including, for example, a web server, or a network sensor with built-in UI.

For an embodiment, the user interface platform 160 is utilized as a "man in the loop". Essentially, a human operator (user) of the user device is utilized to monitor, interact and correct network problems. As stated, the user interface 160 can include the user device (STA), a client and/or an application running on the user device, and/or an application running on a separate device.

For at least some embodiments, the user interface platform 160 monitors the status of the wireless network and raises alerts to the user service engines 130.

For at least some embodiments, the user interface platform 160 changes network settings.

For at least some embodiments, the user interface platform 160 interacts with service engines 130 to localize problems.

Network Operations Center (NOC) Interface Platform

For an embodiment, the NOC interface platform 170 includes an operator that interacts with the NOC services engine to provide the NOC operator with diagnostic information and suggestions for interventions in the network.

For an embodiment, the NOC services engine interacts with the NOC interface platform 170 through the use of alerts, messages, application interfaces.

At least some embodiments allow the operator to observe status of the multiple wireless networks. Further, for at least some embodiments, the operator at the NOC interface platform 170 is able to control settings or configurations of the wireless network 110.

For at least some embodiments, the NOC interface platform 170 includes displaying, monitoring, interacting and correcting network problems. For an embodiment, the operator (a human) is included within the control loop for solving problems associated with the wireless network 110.

Figure 2:
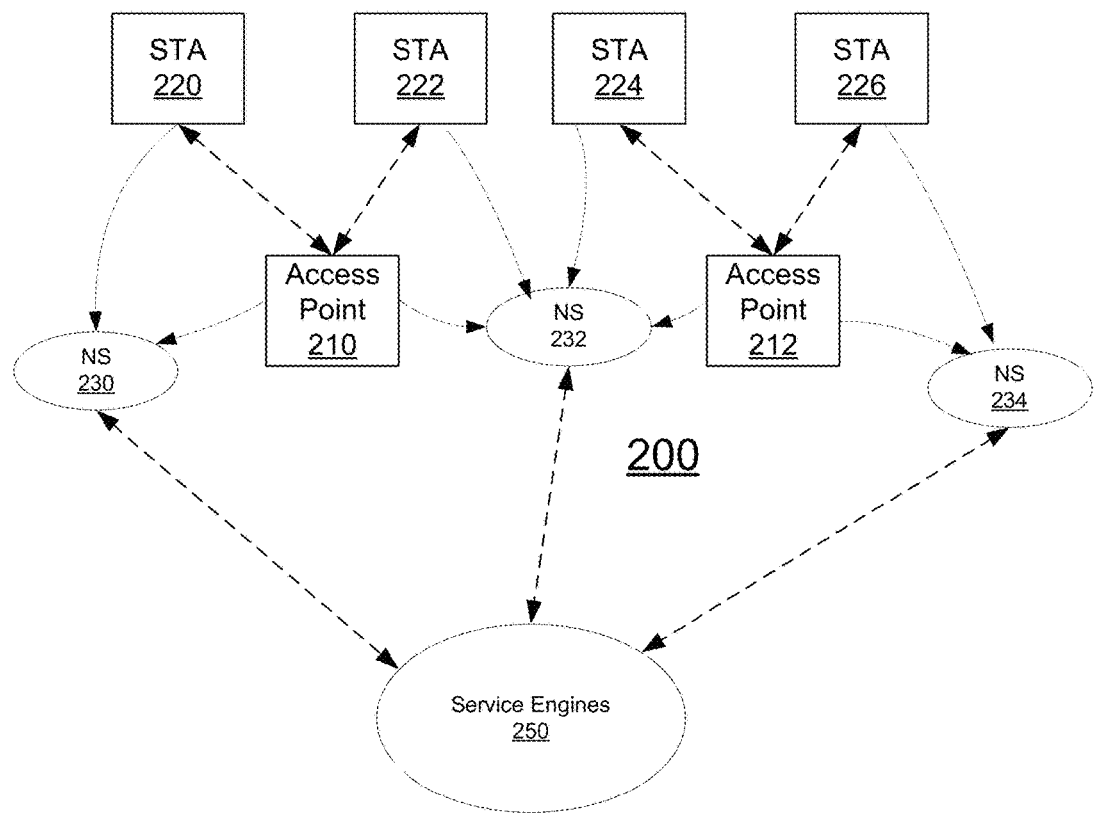
FIG. 2 shows a wireless network that includes multiple wireless sensors, according to an embodiment.

FIG. 2 shows a wireless network 200 that includes multiple network sensor devices, according to an embodiment. The wireless network 200 includes multiple wireless network nodes including access points 210, 212 and stations (STA) 220, 222, 224, 226. Further, network sensors 230, 232, 234 overlay the wireless network 200.

The network sensors 230, 232, 234 are operative to sample the state or conditions of the wireless network 200. While only three network sensors are shown in FIG. 2, it is to be understood that a large number of network sensors may be utilized. Further, with a large number of network sensor continuously sampling conditions of the wireless network 200, the amount of sample data collected can be substantial. Accordingly, the disclosed embodiments provide for sub-sampling of the collected data to reduce system requirements, such as, backhaul requirements needed to support the network sensors. For an embodiment, the subsampling maintains only a predetermined percentage of the packets. For an embodiment, the predetermined percentage is 10%.

For an embodiment, the network sensors 230, 232, 234 receive packets transmitted from one wireless device, and intended for another wireless device. That is, for an embodiment, the network sensors 230, 232, 234 form a second network that overlays the wireless network 200. For example, network sensor 230 may be physically placed within the wireless network 200 so that the network sensor 230 is able to receive packets being transmitted between a user device 220 and an access point 210. Further, the network sensor 232 may be physically placed within the wireless network 200 that the network sensor 232 is able to receive packets being transmitted between a user device 222 and the access point 210. Network sensor 232 may similarly receive wireless signals from the user device 224 and the access point 212, and network sensor 234 may receive wireless signals from the user device 226 and the access point 212.

As wireless communication between the wireless devices of the wireless network 200 typically includes large numbers of packets, for at least some embodiments, the network sensor 230 intelligently determines which of the received packets to retransmit (either wired or wirelessly) to a service engine 250. Further, in at least some embodiments, the wireless network sensor transmits only a descriptor of the received packet to further reduce backhaul usage. For at least some embodiments, the wireless network sensor transmits a representation of the received packet. For at least some embodiments, the service engine 250 utilizes the packets, the descriptors of the packets, or the representations of the packets to identify conditions or anomalies of the wireless network for improving user experience and lower operator cost of the wireless network.

Figure 3:
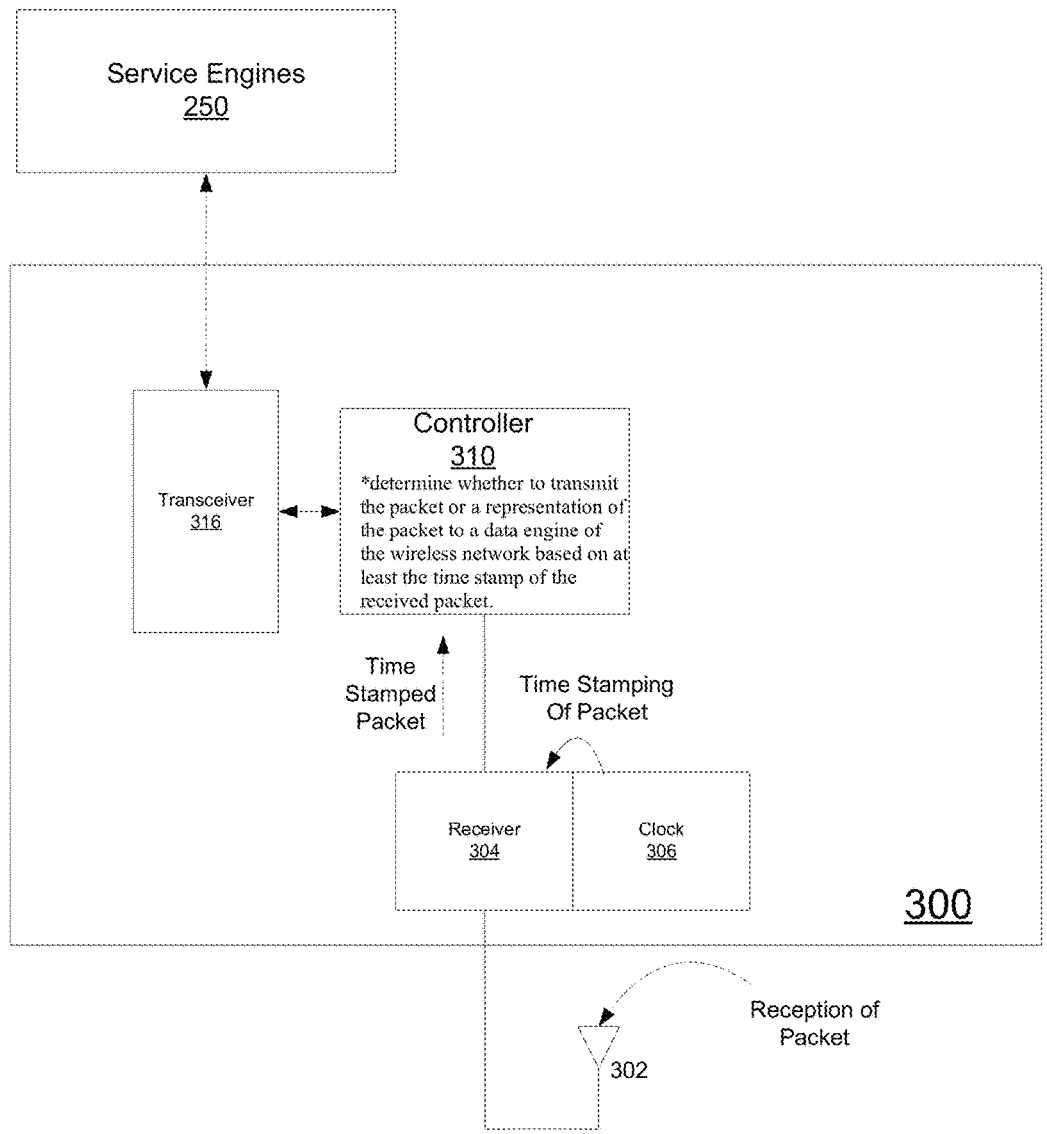
FIG. 3 shows a wireless sensor, according to an embodiment.

FIG. 3 shows a network sensor 300, according to an embodiment. For an embodiment, the network sensor 300 includes an antenna 302 and a receiver 304 for receiving wirelessly transmitted packets. The network sensor 300 includes a clock 306 which is used to time-stamp packets as the packets are received by the receiver 304. For an embodiment, the timestamp is based on the internal clock 306 of the network sensor.

A controller 310 of the network sensor 300 determines if the received packets that have been time-stamped, are to be transmitted by the network sensor 300 to the service engine 250. It is to be understood that transmitting the packets to the service engine 250 includes transmitting at least a representation of the packets. For example, for various embodiments, the representation of the packet includes at least one of the packet, a portion of the packet, a header of the packet, at least a portion of the header of the packet, and/or a descriptor of the packet. For at least some embodiments, the at least a representation of the packet includes a joint representation of an aggregation of representations of multiple packets. Various parameters can be used to make the determination. Essentially, the network sensor 300 functions as a gate for determining which of received packets or representation of the packets are further transmitted to the service engine 250 through, for example, transceiver 316. The gating provides for orchestration between multiple of similar network sensors. The coordination results in subsampling of the packets, which reduces the impact of the packets on, for example, a backhaul of the network sensors.

For an embodiment, algorithms operating on the controller 310 within the network sensor attempt to synchronize the internal clock 306 to internal clocks of other network sensors. For an embodiment, time stamp rules are received by the network sensor 300 from one or more external devices.

For an embodiment, the time-stamp of a packet is used to aid in the determination of whether to transmit the packet to the service engine 250.

For an embodiment, an absolute timestamp is determined on real-time clock hardware in the network sensor. For at least some embodiments, algorithms are operable within the network sensor that keeps these timestamps (roughly) synchronized between different sensors. For an embodiment, the rule that is applied to the timestamp is programmed into the sensor by service engine 250.

For an embodiment, a packet header or packet content of the packet is additionally or alternatively used in the determination of whether to transmit the packet to the service engine 250.

For an embodiment, an internal state of the network sensor is additionally or alternatively used in the determination of whether to transmit the packet to the service engine 250. For an embodiment, the internal state includes at least a data structure that stores list of previously seen transmitter addresses. For an embodiment, the data structure represents the list of transmitter addresses that were active in the wireless network during one or more past observation windows. For an embodiment, the data structure represents traffic patterns (for example, packet rates, data rates) over one or more past observation windows.

As stated, the network sensor 300 selectively transmits packet to the service engine 250. However, for at least some embodiments, the network server 300 also receives information from the service engine 250. The information received from the service engine 250 can include, for example, rules and control messages. The rules can influence whether a packet is transmitted to the service engine 250. The control messages can provide control of the network sensor 300, including, for example, selecting one or more wireless channels for receiver 304, the receiver bandwidth, selecting the type of data to be recorded, resetting the clock 314.

Figure 4:
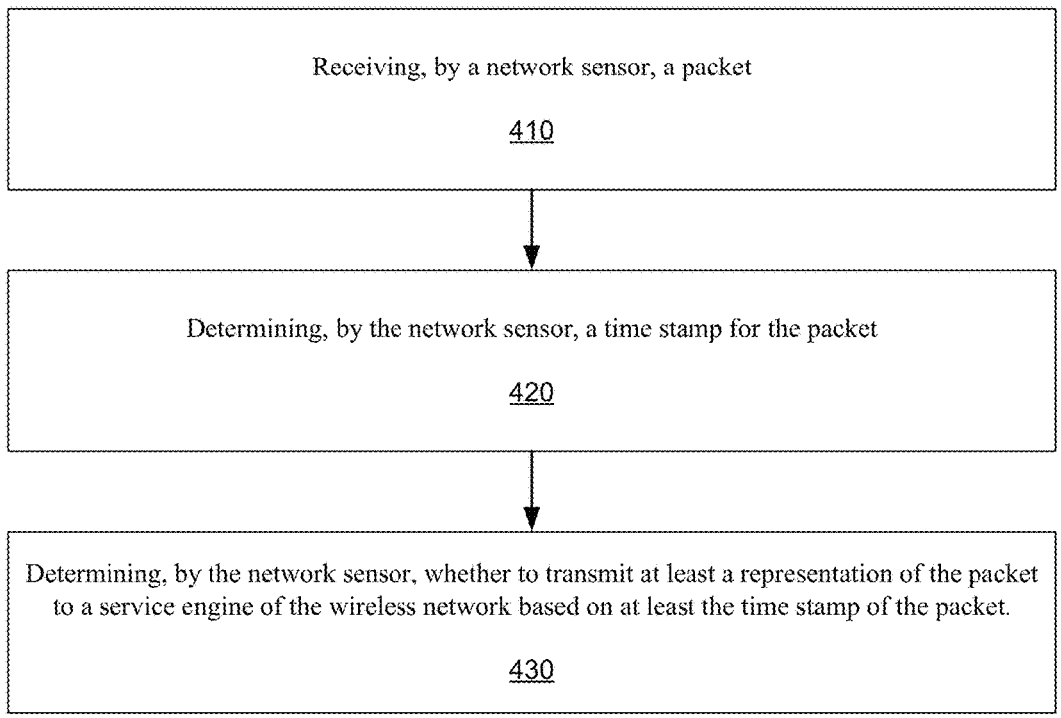
FIG. 4 is a flow chart that includes steps of a method of operating a wireless sensor, according to an embodiment.

FIG. 4 is a flow chart that includes steps of a method of sensing conditions of a wireless network, according to an embodiment. A first step 410 includes receiving, by a network sensor, a packet. A second step 420 includes determining, by the network sensor, a time stamp for the packet. A third step 430 includes determining, by the network sensor, whether to transmit at least a representation of the packet to a service engine of the wireless network based on at least the time stamp of the packet. The network sensors transmits the at least the representation of the packet after determining to transmit the at least the representation of the packet.

For at least some embodiments, the at least a representation of the packet includes at least one of the packet, a portion of the packet, a header of the packet, at least a portion of the header of the packet, and/or a descriptor of the packet. For at least some embodiments, the at least a representation of the packet includes a joint representation of an aggregation of representations of multiple packets, wherein the representation of multiple packets includes representation of the present packet and representation of other packets.

For at least some embodiments, the packet is a data packet, a management packet, or a control packet.

For at least some embodiments, determining whether to transmit the at least the representation of the packet is additionally or alternatively based on at least one of a packet header or packet content. For at least some embodiments, the packet header information includes one or more of transmit addresses, a destination addresses, packet data rate, packet priority, packet type (management, control, data), packet flags, a packet size, and/or other packet meta information. Further, for at least some embodiments, the packet content information include one or more of transmit and destination IP addresses, higher protocol content (for example, DHCP messages, ARP messages), control message in application-level protocols. For example, flow control messages of the control message may precede data rate changes (for example, Netflix resolution changes, Skype adding another caller etc.). For encrypted packet content, at least some embodiments include the packet content information being surrogated by payload length, or sequencing information.

For at least some embodiments, determining whether to transmit the at least the representation of the packet is additionally or alternatively based on an internal state of the network sensor. For an embodiment, the internal state includes at least a data structure that stores list of previously seen transmitter addresses. For an embodiment, the data structure represents the list of transmitter addresses that were active in the wireless network during one or more past observation windows. For an embodiment, the data structure represents traffic patterns (packet rates, data rates) over one or more past observation windows. For an embodiment, the internal state includes probabilistic data structures that reduce a memory footprint at the cost of slightly reduced decision accuracy (for example, approximate membership tests, such as Bloom filters, quotient filters).

For at least some embodiments, determining whether to transmit the at least the representation of the packet is additionally or alternatively based on an external state of the network sensor, wherein the external state comprises non-wireless observations of the sensor or non-wireless events. This includes, for example, presence detection and/or motion detection (that is, determining whether there are people in the room). For an embodiment, the sensed conditions do not relate to the wireless aspect of the wireless network. For an embodiment, the external state includes sensing non-wireless observations of the network sensor, such as non-wireless events. For an embodiment, this includes additional sensing modalities (motion sensor, temperature sensor, etc. . . . ). For an embodiment, the external state includes receiving instruction from a user or operator.

For at least some embodiments, determining whether to transmit the at least the representation of the packet is additionally based on an internal state of the network sensor, and based on at least one of a packet header or packet content.

For at least some embodiments, determining whether to transmit the at least the representation of the packet is additionally based on a decision rule received by the sensor from an external device. That is, the decision or the decision rule is provided to the network sensor from an external source. For example, the service engine provides the decision based on event detection. For example, for an embodiment, the service engine observes an event on at least one of a plurality of sensors, and once observed, the service engine changes the decision rule on another sensor to "zoom in" on this event in more detail. For an embodiment, zooming in includes modifying the decision rule in a way that transmits a larger number of packets or representations of packets.

For at least some embodiments, determining whether to transmit the at least the representation of the packet is additionally based on an at least pseudo randomization rule that results in at least pseudo random transmission of a plurality of packets by the network sensor. For an embodiment, the transmission of the plurality is random. The transmission of the at least the representation of the packet is based on the pseudo randomization rule in that the rule that uses above inputs (timestamp, packet header, packet content, internal state, external state) to make determination of whether to transmit the at least the representation of the packet or not. For at least some embodiments, the at least pseudo randomization rule includes a seed, wherein the seed is received from an external device (for example, service engine).

As previously stated, for an embodiment, the subsampling maintains only a predetermined percentage of the packets. For an embodiment, the predetermined percentage is 10%.

For at least some embodiments, to transmit the at least the representation of the packet is additionally based on a periodic rule that results in periodic transmission of a plurality of packets by the network sensor.

As shown and described, the network sensor is typically used as one of many network sensor of the wireless network. Further, for at least some embodiments, the generation of packets or representations of packets amongst the network sensors is coordinated. That is, for at least some embodiments, each of the plurality of coordination sensors receive a corresponding packet, determine a corresponding time stamp for the corresponding packet, and determine whether to transmit at least a representation of the corresponding packet to the service engine of the wireless network based on at least the time stamp of the received corresponding packet. For an embodiment, corresponding packets mean observations of the same transmitted packet received by different network sensors. The observations can potentially be differently corrupted by the wireless channel. In this embodiment, the plurality of network sensors provides diversity for receiving the same packet.

For at least some embodiments, the plurality of coordinated network sensors are coordinated in their transmission of the at least a representation of the corresponding packet due to the described processes (embodiments) of receiving joint or shared or common, rules, commands, seeds, time synchronization.

For at least some embodiments, the coordination includes each of the multiple network sensors deriving their local timestamps from a common source (for example, the service engine), receiving their rules from common source, or receiving parts of the input for rule from common source (for example, the seed of the pseudorandom function). For at least some embodiments, if the decision rule is purely based on receive timestamp and packet header or content, and the timestamps between each of the plurality of sensors are synchronized, all of the plurality of sensors will make the same decisions on whether to transmit the at least the representation of the packet.

For at least some embodiments, the plurality of coordination network sensors is adaptively selected. For an embodiment, the plurality of coordinated network sensors is adaptively selected based on proximity of the network sensors. For an embodiment, the plurality of network sensors is selected based on an ability of the network sensors to wirelessly communicate with each other. For at least some embodiments, the plurality of network sensors is selected based on a logical grouping, a tenant, an SSID, and/or a communications channel band.

For an embodiment, determining whether to transmit the at least the representation of the packet includes determining a function of a quantized time of the time stamp, the packet content, and a seed that generates random sampling. When the network sensor is one of many network sensor that are all randomizing (or pseudo random) their packet transmission according to the same rule, the upstream device (such as, the services engine) receives the representation of the packets from the many network sensors. Each packet is either received from all or a subset of the plurality of sensors, or from none at all. For a more specific embodiment, determining whether to transmit the at least the representation of the packet includes determining whether a hash function applied to quantized time of the time stamp, the packet content, and the seed modulo n results in a number no larger than m, wherein the quantized time of the time stamp represents a rounded version of the timestamp, the seed is a pre-agreed number (for example generated from a service engine) amongst a plurality of sensor, and wherein n and m are preselected integers.

The quantized time of the time stamp exists because the timestamp synchronization error between sensors is not below a threshold. For at least some embodiments, a quantization level is chosen given the quality of time synchronization or a threshold error between the plurality of sensors.

For at least some embodiments, the seed, and the integers n and m are chosen by an external device, located, for example, in the cloud (for example a service engine). The integers n and m determine the amount of data reduction (sampling rate). Their values individually do not matter, but together they determine the subsampling rate as their ratio m/n.

For at least some embodiments, determining whether to transmit the at least the representation of the packet is additionally based on a confidence interval of time synchronization between the plurality of coordinated network sensors. For at least some embodiments, multiple network sensors receive a common time synchronization signal from a common source (for example, from a services engine), but due to network delays the synchronization is only to a certain accuracy of +-delta. For an embodiment, the confidence interval is the maximum value that delta can take on.

For an embodiment, determining whether to transmit the at least the representation of the packet includes determining whether a hash function applied to quantized time of the time stamp minus (or plus) the confidence interval, the packet content, and the seed modulo n results in a number no larger than m, and/or whether a hash function applied to quantized time of the time stamp plus the confidence interval, the packet content, and the seed modulo n results in a number no larger than m, wherein the quantized time of the time stamp represents a rounded version of the timestamp, the confidence interval is an upper bound on the time synchronization error, the seed is a pre-agreed number amongst a plurality of sensor (for example received from a service engine), and wherein n and m are preselected integers.

For this embodiment, for a plurality of network sensors, packets transmitted by the plurality of sensors are sub-sampled at a rate higher than m/n. If the timestamps of the plurality of sensors are synchronized to within plus or minus delta time between all the plurality of sensors, all of the plurality of sensors will make the same decisions on whether to transmit the at least the representation of the packet.

For at least some embodiments, the internal state of the network sensor and/or determining whether to transmit the at least the representation of the packet includes determining whether (a) a transmitter address of the packet is different than any transmitter address of any other packet evaluated or received within a last T1 seconds, or (b) the transmitter address of the packet matches a transmitter address of another packet that satisfied (a), within the last T2 seconds.

As previously shown (FIG. 1) and described, at least some embodiments include a plurality of the described network sensors placed proximate to the wireless network, wherein a service engine receives a plurality of packets from the plurality of network sensors. Further, as described, the service engine(s) identify conditions of the wireless network based on the received plurality of packets, Such conditions include, but are not limited to, network events, network alerts, network anomalies, network performance problems, and/or protocol deadlocks.

FIG. 5 is a flow chart that includes steps of method of estimating qualities of links between devices of a wireless network, according to an embodiment. A first step 510 includes obtaining, by a service engine, a plurality of link quality signatures, wherein each of the plurality of link quality signatures includes link qualities between a network node and a plurality of network sensors. A second step 520 includes estimating, by the service engine, link qualities between a plurality of network nodes based on the plurality of link quality signatures and a estimation model.

As previously described, for an embodiment, the plurality of network sensors form an overlay network that overlays an existing wireless network that includes at least the plurality of network nodes. For at least some embodiments, the nodes of the existing wireless network provide limited RF information and/or feedback to service engine or to their own access network. The described embodiments provide augmenting information about these nodes to the wireless network 110. For at least some embodiments, these nodes provide limited RF information to their own access network and overlay network extracts additional information which can be provided to the wireless network 110.

For at least some embodiments, the link qualities of the signatures include at least one of RSSI, path loss, MIMO (multiple input, multiple output channel) order, capacity, and/or interference information. For at least some embodiments, the link qualities between a plurality of network nodes includes at least one of RSSI, path loss, MIMO order, modulation schemes, coding schemes, propagation characteristics (LOS, NLOS), capacity, interference information. For an embodiment, the plurality of network nodes includes two network nodes. That is, link qualities are estimated between a pair of nodes based on the plurality of link quality signatures and the estimation model.

At least some embodiments include generating a coverage map by computing (estimating) the link qualities for each Access point and a plurality of access nodes in the coverage map. At least some embodiments include building a graph/map that represents the wireless network by repeating the estimation of link qualities between pluralities of network nodes among many network nodes or locations of the wireless network. For example, the link qualities can be estimated for pairs of nodes within the wireless network. The estimated link qualities can be presented as a graph or map which depicts the link qualities between each of the nodes of the wireless network.

For at least some embodiments, the network service engine obtains a stream of pluralities of link quality signatures. This is, for an embodiment, a continual flow (stream) of link quality signatures are generated over time. For an embodiment, a continual flow (stream) of link quality signatures is generated over space. For an embodiment, a continual flow (stream) of link quality signatures is generated over time and space. For an embodiment, the continual flow (stream) of link quality signatures is received by the service engine. At least some embodiments include averaging multiple of the stream of pluralities of link quality signatures. For an embodiment, the averaging is performed at the network service engine. For an embodiment, the averaging is performed by the network sensors before being received by the service engine. That is, the service engine received a stream of link quality signatures that have been averaged over time.

For at least some embodiments, each signature is based on a single packet received by the plurality of network sensors from the single network node. That is, the single packet was transmitted by the single network node, and received by the plurality of network sensors.

For at least some embodiments, obtaining the plurality of link quality signatures includes receiving a packet descriptor from each of a plurality of network sensors, and comparing the packet descriptors to determine which packets were commonly received from the single network node by multiple of the network sensors. For at least some embodiments, the packet descriptor includes a packet transmitter address. For at least some embodiments, the packet descriptor includes a timestamp of when the packet was received by a network sensor of the plurality of network sensors.

At least some embodiments include determining the estimation model. For an embodiment, this includes characterizing wireless propagation with physical equations. For an embodiment, the determining the estimation model includes characterizing wireless propagation based on training measurements of link quality signatures from a second plurality of network sensors and corresponding training measurements of link quality from a second plurality of network nodes. For an embodiment, the second plurality of network sensors and/or network nodes is used for training the estimation model. In an embodiment the prior measurements are designed such that they cover possible relative locations of network sensors and/or network nodes. In another embodiment, the second plurality of network sensors is identical to the plurality of network sensors being utilized in link quality estimation based on the estimation model.

For an embodiment, the determining the estimation model includes determining the estimation model comprising characterizing wireless propagation with physical equations and characterizing wireless propagation based on prior measurements of link quality signatures and corresponding link quality between nodes. For at least some embodiments, determining the estimation model includes assigning different weights to different cases of the training measurements. For an embodiment, the weights are determined based on a function of the measured link quality between nodes. For example, during construction of the estimation model, cases in which the link quality is low are given additional weighting. Specifically, for example, an objective function used in model optimization is chosen such that errors at low link qualities are penalized more than errors at high link quality. For example, link quality estimation is used to monitor rate control algorithms. The critical cases for these algorithms are when the link quality is below a threshold, hence these cases are weighted more. For an embodiment, the training data is measured in a geometric. For an embodiment, the weights are used to rebalance the training data in order to match it better to the application case, thus (partially) compensating the mismatch.

At least some embodiments include determining the estimation model by modeling network sensor operation before deployment of the network sensors.

For at least some embodiments, an estimation model is precomputed for each of a plurality of different scenarios (for example, office, campus, residential, etc.), and one of the estimation models is selected for each actual deployment. Further, for an embodiment, the estimation model is based on physical equations of wireless propagation. During deployment of the network sensors, the sensor locations are recorded. These sensor locations can be used to determine the sensor distances, which together with the physical equations, can be used to determine the model.

For at least some embodiments, determining the estimation model includes modeling network sensor operation after deployment of the network sensors. Further, for at least some embodiments, the estimation model is initialized before deployment, and adapted to the deployment site based on a set of measurements performed by the plurality of network sensors. Further, for at least some embodiments, the estimation model continually adapts to additional measurements that become available while deployed.

For at least some embodiments, estimating the link qualities between the plurality of network nodes is further based on link quality signatures between the plurality network sensors. For an embodiment, the link quality signatures between the plurality of network sensors is further based on a subset of the plurality of network sensors transmitting packets and other network sensors of the plurality of network sensors receiving and estimating a link quality between the plurality of network sensors. Specifically, for an embodiment, this includes the network sensors determining link strengths between each other by transmitting sounding packets, and supplementing the estimation model with the link strengths determined between the network sensors.

As will be described, for at least some embodiments a processing engine uses sensor-to-sensor link strengths as additional model inputs. That is, along with the plurality of link quality signatures between a network node and a plurality of network sensors, the sensor-to-sensor link strengths are as additional model inputs into the network estimation model.

For an embodiment, the sounding packets are constructed in a way as not to interfere with regular operation of wireless network. For example, for an embodiment, the sounding packets are only transmitted and utilized during periods of low-use of the wireless network, such as at night when a business that utilizes the wireless network is not very active, or active below a threshold level. For an embodiment, the sounding packets are transmitted when activity of the wireless network is sensed to be low or below a threshold. By only transmitting and utilizing the sounding packets during low-use times, the impact of the sounding packets on the network can be minimized.

For at least some embodiments, the link quality signatures between the network sensors are determined upon sensing a motion of one or more of the network nodes of greater than a threshold.

For at least some embodiments, the link quality signatures between the network sensors are determined periodically, wherein periodically could be regularly or within a max period of elapsed time or within a time interval.

At least some embodiments further includes preprocessing each of the plurality of link quality signatures before estimating the link qualities, and estimating the link qualities between the pair of network nodes based on the plurality of preprocessed link quality signatures and the network estimation model. For at least some embodiments, the estimation model is based on one or more of a node type, a node capability, a node transmission power level, a node receiver sensitivity, a node receiver gain, a modulation/coding scheme, or a number of active transmitters.

For at least some embodiments, preprocessing each of the link qualities of each signature of each network sensor includes determining a ratio of the link quality between the network sensor and the network node and a link quality between a selected network sensor and the network node, thereby accounting for variations in transmit power of the network node over time.

Figure 6:
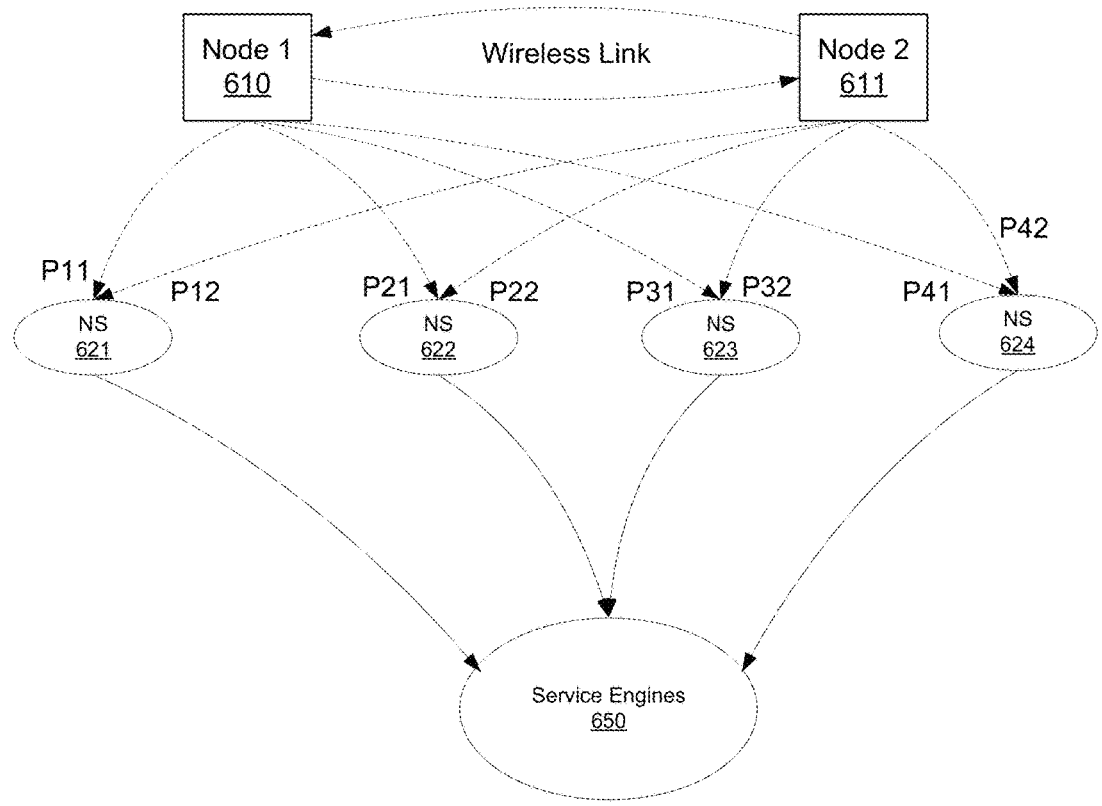
FIG. 6 shows a pair of wireless end devices and wireless sensors, according to an embodiment.

FIG. 6 shows a pair of network nodes 610, 620 and network sensors 621, 622, 623, 624, according to an embodiment. The network nodes 610, 620 represent two nodes of a wireless network that are communicating with each other. The network sensors 621, 622, 623, 624 are operable to "overhear" the wireless communication between the network nodes 610, 620. Based on the overheard wireless communication, the quality of the wireless link between the wireless access nodes 610, 620 is estimated.

For an embodiment, a services engine 650 receives representations of the wireless signals received by each of the wireless network sensors 621, 622, 623, 624. As described, for an embodiment, the network service engine 650 is operable to obtain a plurality of link quality signatures, wherein each signature includes link qualities between a network node (such as, wireless node 610 or wireless node 611) and a plurality of network sensors (such as, wireless network sensors 621, 622, 623, 624), and estimate link qualities between the pair of network nodes (610, 611) based on the plurality of link quality signatures and a network estimation model.

Exemplary Steps for Constructing the Estimation Model

For at least some embodiments, the use of the estimation model begins with:

Selecting a Parameterizable model, namely a function $y_{est}=f(x_1, x_2, x_3, \ldots, x_p, c_1, c_2, c_3, \ldots, c_k)$, where f is the estimator function, and $y_{est}$ is the output of the estimator.

For at least some of the embodiments described, the estimated link quality ($y_{est}$) is, for example, between node 610 and node 611, and $x_1, x_2, x_3, \ldots, x_p$ are predictor variables (the inputs of the estimator). For at least some of the embodiments described, $x_1, x_2, x_3, \ldots, x_p$ are the link quality signatures for node 610 and node 611 (each consisting of link quality numbers as observed by sensors 621, 622, 623, 624). In other words, p=8 numbers.

For at least some of the described embodiments, these inputs additionally include pairwise link quality signatures between sensors 621,622,623,624. In other words, an additional 6 numbers for a total of p=14.

Further, $c_1, c_2, c_3, \ldots, c_k$ are parameters of the estimator.

For at least some embodiments, the values of these parameters are learned during a training phase.

A training dataset, namely n examples of the form $(y^{(i)}, x_1^{(i)}, x_2^{(i)}, x_3^{(i)}), \ldots, x_p^{(i)})$ for i=1 to n, where $y^{(i)}$ is the link quality between nodes 610 and 611 for the ith training example $x_1^{(i)}, x_2^{(i)}, x_3^{(i)}, \ldots, x_p^{(i)}$ are the values of the predictor variables for the ith training example.

Estimation Model Construction (Training):

For at least some embodiments, training of the estimation model includes:

1. First, the parameters of the estimator are initialized, using one of

Set $c_1, c_2, c_3, \ldots, c_k$ to random numbers in a predefined range, or

Set $c_1, c_2, c_3, \ldots, c_k$ to predefined fixed numbers, or

Set $c_1, c_2, c_3, \ldots, c_k$ to numbers derived from the training data set with a predefined computation rule, or Set $c_1, c_2, c_3, \ldots, c_k$ to numbers derived from a physical equations of wireless signal propagation.

2. Next, for j in 1, 2, 3, . . .

For i in 1, 2, 3, . . . , n, consider example i from the training dataset

Compute estimate $y_{est}^{(i)}=f(x_1^{(i)}, x_2^{(i)}, x_3^{(i)}, \ldots, x_p^{(i)}, c_1, c_2, c_3, \ldots, c_k)$ based on the current parameters of the estimator Compute the current estimation error $e^{(i)}=y^{(i)}-y_{est}^{(i)}$ Based on a predefined rule that depends on the estimate $y_{est}^{(i)}$, the true value $y^{(i)}$, and the current parameters of the estimator $c_1, c_2, c_3, \ldots, c_k$, compute new parameters of the estimator (to reduce the estimation error of the current example)

3. Stop the loop over j in step 2 based on one or more of the following stopping criteria Estimation error $e^{(i)}$, averaged over all n examples in the training set, did not change significantly as compared to the previous run of the loop (previous value of j)

Parameters of the estimator $c_1, c_2, c_3, \ldots, c_k$ did not change significantly as compared to the previous run of the loop (previous value of j)

4. Store the final values of the parameters of the estimator $c_1, c_2, c_3, c_k$. They specify the estimation model.

At least some embodiments include variations on the method above:

weighting the training set:

Assign a weight to each example in the training dataset. In the method above, the implicit weight for the ith example is the equal weight $w_i=1/n$. More generally, the weight can be computed based on the true link quality $y^{(i)}$, the predictor values $x_1^{(i)}, x_2^{(i)}, x_3^{(i)}, \ldots, x_p^{(i)}$, or on a combination of the two Instead of visiting all examples i=1, . . . , n in equal proportion (in the inner loop of step 2), visit each example at a frequency proportional to its weight in each loop over j, use a random subset of the training dataset instead of the entire dataset (to save computation)

construct multiple estimation models (with different random starting conditions, or different random subsets of the training set, or different parameterizable estimator function f), and combine the estimates with a combining function . . . (there are a lot of variations: online learning, cross-validation, . . . )

Some exemplary specific examples of parameterizable models f:

Neural networks

Support vector regression

Generalized linear models

Regression trees

Model Application:

For at least some embodiments, application of the estimation model includes:

1. Picking two nodes between which the wireless link quality is to be estimated;
2. Obtaining values of the predictor variables $x_1, x_2, x_3, \ldots, x_p$ for the chosen nodes;
3. Load parameters of the estimator $c_1, c_2, c_3, \ldots, c_k$ as computed during model construction;
4. Compute the estimated link quality $y_{est}=f(x_1, x_2, x_3, \ldots, x_p, c_1, c_2, c_3, \ldots, c_k)$;
5. Output the estimated link quality $y_{est}$.

The steps can be repeatedly executed;

for the same pair of nodes, if the predictor variables change over time.

for all pairs among a set of at least two nodes, in order to obtain a connectivity graph between the nodes.

Although specific embodiments have been described and illustrated, the embodiments are not to be limited to the specific forms or arrangements of parts so described and illustrated.

What is claimed:

1. A method of estimating qualities of links between nodes, comprising:

passively receiving, by a plurality of network sensors configured to determine link quality, a plurality of wireless packets between a network device and an access point to the wireless network;

obtaining, by a service engine, a plurality of link quality signatures from the plurality of network sensors, wherein each of the plurality of link quality signatures includes capacity and strength link qualities between a network node, the network node including the network device or the access point, and the plurality of network sensors, wherein the obtained plurality of link quality signatures are determined upon sensing a motion of the network node of greater than a threshold;

estimating, by the service engine, the capacity and strength link qualities between the network device and the access point based on training measurements on the plurality of link quality signatures and an estimation model;

determining the estimation model by assigning different weights to different cases of the training measurement, wherein assigning the different weights includes assigning additional weight to the different cases of the training measurement if the capacity and strength link qualities are below a threshold; and wherein obtaining the plurality of link quality signatures by the service engine is based on a sampling rate of the plurality of wireless packets, and wherein a plurality of coordinated network sensors of the plurality of network sensors is synchronized relative to the sampling rate to improve data throughput to the service engine.

2. The method of claim 1, further comprising obtaining, by the service engine a stream of pluralities of link quality signatures.

3. The method of claim 2, further averaging multiple of the stream of pluralities of link quality signatures.

4. The method of claim 1, wherein each signature of the plurality of link quality signatures is based on a wireless packet of the plurality of wireless packets passively received by the plurality of network sensors.

5. The method of claim 1, wherein obtaining the plurality of link quality signatures comprises:

receiving a wireless packet descriptor from each of the plurality of network sensors;

comparing the wireless packet descriptors to determine which wireless packets were commonly received from the network node by the plurality of network sensors.

6. The method of claim 5, wherein the wireless packet descriptor includes a packet transmitter address.

7. The method of claim 5, wherein the wireless packet descriptor includes a timestamp of when the wireless packet was received by a network sensor of the plurality of network sensors.

8. The method of claim 1, further comprising determining the estimation model based on wireless propagation equations.

9. The method of claim 1, further comprising determining the estimation model comprising characterizing wireless propagation based on training measurements of link quality signatures from a second plurality of network sensors and corresponding training measurements of link quality from a second plurality of network nodes.

10. The method of claim 1, further comprising determining the estimation model comprising characterizing wireless propagation with physical equations and characterizing wireless propagation based on prior measurements of link quality signatures and corresponding link quality between a second plurality of network nodes.

11. The method of claim 1, wherein the estimation model is precomputed for each of a plurality of different scenarios, and one of the estimation models is selected for each deployment.

12. The method of claim 1, further comprising determining the estimation model comprising:

modeling network sensor operation after deployment of the plurality of network sensors.

13. The method of claim 12, wherein the estimation model is initialized before deployment, and adapted to a deployment site based on a set of measurements performed by the plurality of network sensors.

14. The method of claim 12, wherein the estimation model continually adapts to additional measurements that become available while deployed.

15. The method of claim 1, wherein estimating the link qualities between the plurality of network nodes is further based on link quality signatures between the plurality of network sensors.

16. The method of claim 15, wherein the link quality signatures between the plurality of network sensors is further based on a subset of the plurality of network sensors transmitting wireless packets and other network sensors of the plurality of network sensors receiving and estimating a link quality between the plurality of network sensors.

17. The method of claim 16, wherein the link quality signatures between the network sensors is determined periodically.

18. The method of claim 1, further comprising preprocessing each of the plurality of link quality signatures before estimating the link qualities, and estimating the link qualities between the plurality of network nodes based on the plurality of preprocessing link quality signatures and the estimation model.

19. The method of claim 18, wherein preprocessing each of the link qualities of each signature of each network sensor comprises determining a ratio of the link quality between the network sensor and the network node and a link quality between a selected network sensor and the network node, thereby accounting for variations in transmit power of the network node over time.

20. A wireless network comprising:

a plurality of network nodes;

a plurality of network sensors configured to determine link quality, wherein the plurality of network sensors passively receive a plurality of wireless packets between a network device and an access point to the wireless network;

a service engine, wherein the service engine is operative to:

obtain a plurality of link quality signatures from the plurality of network sensors, wherein each signature includes capacity and strength link qualities between a network node, the network node including the network device or the access point, and the plurality of network sensors, wherein the plurality of link quality signatures is determined upon a motion of the network node of greater than a threshold;

estimate the capacity and strength link qualities between the network device and the access point based on training measurements on the plurality of link quality signatures and an estimation model;

determine the estimation model, wherein determining the estimation model includes assigning different weights to different cases of the training measurements, wherein assigning the different weights includes assigning additional weight to the different cases of the training measurement if the capacity and strength link qualities are below a threshold, rebalancing the training measurements using the different weights; and wherein obtaining the plurality of link quality signatures by the service engine is based on a sampling rate of the plurality of wireless packets, and wherein a plurality of coordinated network sensors of the plurality of network sensors is synchronized relative to the sampling rate to improve data throughput to the service engine.

* * * * *